United States Patent
Atyam et al.

(10) Patent No.: US 10,069,688 B2
(45) Date of Patent: Sep. 4, 2018

(54) DYNAMICALLY ASSIGNING, BY FUNCTIONAL DOMAIN, SEPARATE PAIRS OF SERVERS TO PRIMARY AND BACKUP SERVICE PROCESSOR MODES WITHIN A GROUPING OF SERVERS

(71) Applicant: INTERNATIONAL BUSINESS MACHINES CORPORATION, Armonk, NY (US)

(72) Inventors: Balaji V. Atyam, Austin, TX (US); Venkatesh Sainath, Bangalore (IN); Vishwanatha Subbanna, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 15/062,270

(22) Filed: Mar. 7, 2016

(65) Prior Publication Data
US 2017/0257275 A1 Sep. 7, 2017

(51) Int. Cl.
*H04L 12/24* (2006.01)
*H04L 29/08* (2006.01)
*H04L 29/14* (2006.01)

(52) U.S. Cl.
CPC ...... *H04L 41/0893* (2013.01); *H04L 41/0816* (2013.01); *H04L 67/1008* (2013.01); *H04L 67/1034* (2013.01); *H04L 69/40* (2013.01)

(58) Field of Classification Search
CPC ............ H04L 41/0816; H04L 41/0893; H04L 41/0813; H04L 43/0817; H04L 67/1044; H04L 67/1008; H04L 67/1031; H04L 67/1034
USPC ....................................................... 709/221
See application file for complete search history.

(56) References Cited

U.S. PATENT DOCUMENTS

| | | | |
|---|---|---|---|
| 6,931,568 B2 | 8/2005 | Abbondanzio et al. | |
| 7,433,914 B2 | 10/2008 | Davis et al. | |
| 7,512,830 B2 | 3/2009 | Chu et al. | |
| 8,769,132 B2 | 7/2014 | Sreenivasan et al. | |
| 2003/0005350 A1* | 1/2003 | Koning | H04L 67/1002 714/4.11 |
| 2006/0090001 A1* | 4/2006 | Collins | H04L 29/06027 709/230 |
| 2008/0126854 A1 | 5/2008 | Anderson et al. | |
| 2010/0011241 A1 | 1/2010 | Uchida | |

(Continued)

*Primary Examiner* — Ruolei Zong
(74) *Attorney, Agent, or Firm* — Joseph Petrokaitis; Amy J. Pattillo (57) ABSTRACT

Multiple functional domains are identified for controlling a grouping of servers. A controller assigns, to each functional domain of the multiple functional domains, a separate primary server from among the grouping of servers and a separate backup server from among the grouping of servers, wherein for each functional domain the separate primary server is different from the separate backup server based on a separate affinity selection for each functional domain. Responsive to detecting a failure in a particular primary server of the grouping of servers, the controller automatically switches control of a particular functional domain assigned to the particular primary server from the particular primary server to a particular backup server assigned to the particular functional domain.

20 Claims, 6 Drawing Sheets

(56) References Cited

U.S. PATENT DOCUMENTS

2013/0013759 A1\* 1/2013 Austen .............. H04L 29/08099
709/223
2013/0346587 A1\* 12/2013 Barkett ................. G06Q 50/01
709/224
2016/0062854 A1\* 3/2016 Allen ................. H04L 67/1097
714/4.11

\* cited by examiner

MAPPING 400

| FUNCTIONAL DOMAIN 410 | PRIMARY SERVICE PROCESSOR 412 | BACKUP SERVICE PROCESSOR 414 | |
|---|---|---|---|
| INTERACTION WITH PRIMARY CHASSIS MANAGEMENT MODULE | SERVER IN SLOT 1 | SERVER IN SLOT 13 | ← 420 |
| INTERACTION WITH BACKUP CHASSIS MANAGEMENT MODULE | SERVER IN SLOT 2 | SERVER IN SLOT 1 | ← 422 |
| INTERACTION WITH PRIMARY MANAGEMENT CONSOLE | SERVER IN SLOT 3 | SERVER IN SLOT 2 | ← 424 |
| INTERACTION WITH BACKUP MANAGEMENT CONSOLE | SERVER IN SLOT 4 | SERVER IN SLOT 3 | ← 426 |
| INTERACTION WITH HYPERVISOR | SERVER IN SLOT 5 | SERVER IN SLOT 4 | ← 428 |
| HOSTING WEB SERVER BASED INTERFACES (ADVANCED SYSTEMS MANAGEMENT INTERFACE ON SERVICE PROCESSORS IN UNIX-BASED SERVER SYSTEMS) | SERVER IN SLOT 6 | SERVER IN SLOT 5 | ← 430 |
| INTERACTION WITH CIM CLIENTS | SERVER IN SLOT 7 | SERVER IN SLOT 6 | ← 432 |
| SERVICE PROCESSOR TO HOST PROCESSOR BUS OWNERSHIP AND INTERACTION | SERVER IN SLOT 8 | SERVER IN SLOT 7 | ← 434 |
| HARDWARE SURVEILLANCE | SERVER IN SLOT 9 | SERVER IN SLOT 8 | ← 436 |
| SOFT FUNCTION SURVEILLANCE | SERVER IN SLOT 10 | SERVER IN SLOT 9 | ← 438 |
| VIRTUAL SERIAL TERMINAL CONNECTIONS TO VIRTUAL PARTITIONS RUNNING ON HOST PROCESSOR | SERVER IN SLOT 11 | SERVER IN SLOT 10 | ← 440 |
| FRU SERVICE INTERFACE BUS OWNERSHIP | SERVER IN SLOT 12 | SERVER IN SLOT 11 | ← 442 |
| DEBUG INFO AND ERROR LOG AGGREGATION | SERVER IN SLOT 13 | SERVER IN SLOT 12 | ← 444 |

*FIG. 4*

| AFFINITY TABLE 500 | | | | |
|---|---|---|---|---|
| GROUPS 510 | FUNCTIONAL DOMAINS 512 | SERVICE PROCESSOR LEVEL STRENGTH 514 | CHASSIS LEVEL STRENGTH 516 | |
| GROUP 1 | INTERACTION WITH HMC, TEXT CONSOLES TO PARTITION FROM HMC | STRENGTH : 3 | STRENGTH : 1 | 520 |
| GROUP 2 | INTERACTION WITH HMC, INTERACTION WITH HYPERVISOR | STRENGTH : 5 | STRENGTH : 1 | 522 |
| GROUP 3 | INTERACTION WITH CMM, SOL SESSIONS TO PARTITION FROM CMM | STRENGTH : 5 | STRENGTH : 1 | 524 |
| GROUP 4 | INTERACTION WITH PRIMARY CMM, INTERACTION WITH BACKUP CMM | STRENGTH : 2 | STRENGTH : 5 | 526 |

DYNAMICALLY ASSIGNING, BY FUNCTIONAL DOMAIN, SEPARATE PAIRS OF SERVERS TO PRIMARY AND BACKUP SERVICE PROCESSOR MODES WITHIN A GROUPING OF SERVERS

BACKGROUND

1. Technical Field

This invention relates in general to a data processing system and more particularly to assigning, by functional domain, separate pairs of servers to primary and backup service processor modes within a grouping of servers.

2. Description of the Related Art

A server system typically includes multiple processors, with one processor designated as a service processor. A service processor performs one or more platform level functions to manage the hardware of the server and to interact with other servers in a grouping of servers.

BRIEF SUMMARY

In one embodiment, a method is directed to identifying functional domains for controlling a grouping of servers. The method is directed to determining a separate affinity selection for each of a plurality of separate groupings each of two or more of the plurality of functional domains indicating a strength of an affinity that each of the two or more of the plurality of functional domains need to reside on one or more of a same service processor and a same chassis within the plurality of servers. The method is directed to assigning, to each functional domain of the multiple functional domains, a separate primary server from among the grouping of servers and a separate backup server from among the grouping of servers, wherein for each functional domain the separate primary server is different from the separate backup server and positioned on the plurality of servers based on the separate affinity selection for each of the plurality of separate groupings. The method is directed, responsive to detecting a failure in a particular primary server of the grouping of servers, to automatically switching control of a particular functional domain assigned to the particular primary server from the particular primary server to a particular backup server assigned to the particular functional domain, such that only the particular functional domain from among the plurality of functional domains is down during the failure and switching control.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to identify functional domains for controlling a grouping of servers. The stored program instructions comprise program instructions to determine a separate affinity selection for each of a plurality of separate groupings each of two or more of the plurality of functional domains indicating a strength of an affinity that each of the two or more of the plurality of functional domains need to reside on one or more of a same service processor and a same chassis within the plurality of servers. The stored program instructions comprise program instructions to assign, to each functional domain of the multiple functional domains, a separate primary server from among the grouping of servers and a separate backup server from among the grouping of servers, wherein for each functional domain the separate primary server is different from the separate backup server and positioned on the plurality of servers based on the separate affinity selection for each of the plurality of separate groupings. The stored program instructions comprise program instructions to, responsive to detecting a failure in a particular primary server of the grouping of servers, to automatically switch control of a particular functional domain assigned to the particular primary server from the particular primary server to a particular backup server assigned to the particular functional domain.

In another embodiment, a computer program product comprises one or more computer-readable storage devices and program instructions, stored on at least one of the one or more storage devices. The stored program instructions comprise program instructions to identify functional domains for controlling a grouping of servers. The stored program instructions comprise program instructions to determine a separate affinity selection for each of a plurality of separate groupings each of two or more of the plurality of functional domains indicating a strength of an affinity that each of the two or more of the plurality of functional domains need to reside on one or more of a same service processor and a same chassis within the plurality of servers. The stored program instructions comprise program instructions to assign, to each functional domain of the multiple functional domains, a separate primary server from among the grouping of servers and a separate backup server from among the grouping of servers, wherein for each functional domain the separate primary server is different from the separate backup server and positioned on the plurality of servers based on the separate affinity selection for each of the plurality of separate groupings. The stored program instructions comprise program instructions to, responsive to detecting a failure in a particular primary server of the grouping of servers, to automatically switch control of a particular functional domain assigned to the particular primary server from the particular primary server to a particular backup server assigned to the particular functional domain.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
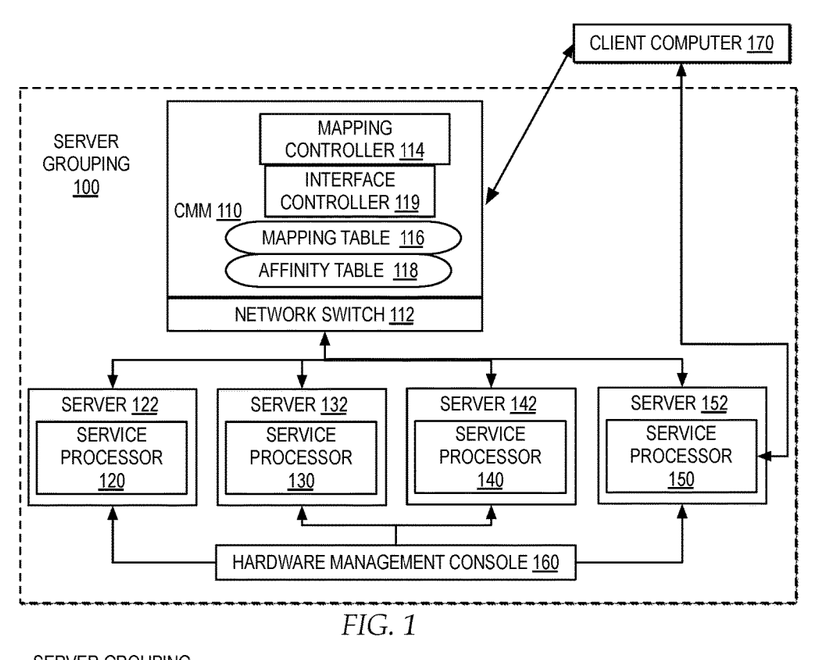
FIG. 1 is a block diagram illustrating one example of a grouping of servers in which independent primary and backup mode responsibilities are assigned by functional domain across service processors within a grouping of servers.

FIG. 1 illustrates a block diagram of one example of a grouping of servers in which independent primary and backup mode responsibilities are assigned by functional domain across service processors within a grouping of servers.

In one example, a server grouping 100 may include one or more servers, such as a server 122, a server 132, a server 142, and a server 152. In one example, each of server 122, server 132, server 142, and server 152 may represent one or more types of servers including, but not limited to, blade servers and microservers. In one example, server grouping 100 may represent multiple servers, such as server 122, server 132, server 142, and server 152 installed within a single chassis or across multiple chassis, each operating in a non-uniform memory access (NUMA) mode with a single instance of a hypervisor virtualizing resources across the servers in server group 100, such as in asymmetric multi-processing (AMP) or symmetric multiprocessing (SMP) mode.

In one example, a blade server within server grouping 100 may represent one or more thin, modular electronic circuit boards. In one example, each blade server may have one or more components removed to minimize space and minimize power consumption, while providing all the functions of a server. In one example, server grouping 100 may implement one or more blade enclosures, such as one or more chassis, for housing multiple blade servers, and which provides services including, but not limited to, power, cooling, networking, various interconnects, and management. A chassis may include one or more slots into which blade servers may be temporarily installed.

In one example, each server within server grouping 100 includes multiple processors designated as host processors.

Server grouping 100 also includes one or more service processors. For example, server 122 includes a service processor 120, server 132 includes a service processor 130, server 142 includes a service processor 140, and server 152 includes a service processor 150.

In one example, each service processor may be communicatively connected within server grouping 100 to a chassis management module (CMM) 110 or other group management controller through one or more network switches, such as a network switch 112. In one example, server grouping 100 may represent one or more chassis, where CMM 110 may be configured as a multiple chassis management node. In one example, CMM 110 is a module that provides multiple system management functions for all the chassis components within server group 100. For example, system management functions may include, but are not limited to, power, cooling, networking, various interconnects, and management. In one example, server group 100 may implement more than one CMM where system management functions may be distributed across multiple CMM or where one CMM may function as a primary CMM, with other CMM available as backup in the event of a failure of the primary CMM. In one example, CMM 110 may represent a hot-swappable module that provides system-management functions for all the components in a chassis. In addition, in one example, CMM 110 may control a serial port for connection to a local console or to a serial management network. In one example, server grouping 100 may include additional or alternate group management controller components including, but not limited to one or more management consoles.

In one example, each service processor may perform one or more primary functions. In one example, a primary function of a service processor may include managing the hardware on the server, including interacting with a host processor on the server and handling surveillance of the host processor, Fru Support Interface (FSI) buses, thermal sensors management, hardware error handling, hardware error detection, and deployment of redundant spares, such as cache lines and memory lanes, available on the server. In addition, a primary function of a service processor may include interacting with CMM 110 for security provisioning, fan control, and chassis management. In addition, a primary function of a service processor may include interacting with the management console for virtualization management on the server and interacting with a hypervisor for virtualization functions.

A similar architecture to the illustration in FIG. 1 may be implemented in an example where the servers are micro servers with a board management controller (BMC) per node and a chassis management controller (CMC), hardware management controller (HMC), such as HMC 160, or other management controller (MC) across all the nodes share the systems management responsibilities. A microserver chassis may share components for power, cooling, and management fabric. Also, common network switches may be provided per chassis that cater to all the server cartridges in the chassis. A rack can host multiple of these chassis. Because a microserver chassis may provide a single rack for hosting thousands of servers, managing the server cartridges as individual servers requires a significant amount of resources.

When multiple servers are positioned within a single chassis or across multiple chassis, operating in NUMA mode with a single instance of hypervisor virtualizing resources across the servers in server grouping 100, such as in SMP mode, generally, a service processor on one of the servers assumes the role of primary while all the other service processors on the other servers assume the role of backup.

When the service processor operating in the role of primary encounters an unrecoverable error, the backup service processors will vote and one of the backup service processors will take over the role of primary and host all the service processor primary functionality. This process of a backup service processor taking over the role of primary is called fail-over, where the role change happens across all service processors.

In one example, when a failure in the server hosting the primary service processor brings down all the hosted functionality, there is a significant delay before one of the backup service processors assumes the role of the primary and starts performing the functions. This delay occurs because there are multiple backup service processors in the SMP configuration and the service processors may perform steps to vote for one of the backup service processors to take the role of primary service processor. Any ongoing interactions with management consoles, text consoles, with any partition and interaction with the host processor is disturbed. Further, in the case of blade servers, it is possible for an end-user to pull out the blade server from the chassis as it is not very evident to know which blade servers are operating together in SMP mode and there is no obvious way to know which blade server's service processor is acting as primary.

In one example, to minimize the delays caused by failover when multiple types of management functionality are consolidated into a single service processor, CMM 110 implements a mapping controller 114 to distribute the redundancy of the functions provided by the primary service processor in a SMP configuration, at the function level, across multiple servers in server grouping 100. In one example, mapping controller 114 may be implemented in multiple types of server groupings, including, but not limited to, a blade architecture and a microserver architecture.

In one example, mapping controller 114 identifies a separate functional domain for each of the functionalities hosted by a service processor and distributes the functional domains independently across multiple service processors, thereby avoiding a single point of failure for all serviced functionalities on the primary service processor. For example, mapping controller 114 may identify a mapping of the service processors within the servers participating in the SMP configuration within server group 100. Next, mapping controller 114 may dynamically specify a mapping table 116 to include an entry for each functional domain and to assign to each functional domain, an independent assignment of a primary service processor and a backup service processor from among the mapped service processors. In one example, the list of functional domains in mapping table 116 may be statically defined, with the mapping of a primary service processor and a backup service processor to each functional domain decided dynamically by CMM 110 at run-time. In one example, each service processor specified in mapping table 116 may be identified according to one or more types of identifiers including, but not limited to, a Machine Type Model Serial number (MTMS). Next, mapping controller 114 may communicate mapping table 116 to all the service processors, such as service processor 120, service processor 130, service processor 140, and service processor 150, through network switch 112. In addition, each of the service processors may broadcast the IP address, MTMS, and capabilities to the other service processors, via network switch 112. Each of the service processors may update a locally stored copy of mapping table 116 with the IP address and capabilities associated with the MTMS for each of the service processors. In the example, network switch 112 may be hosted by CMM 110 or may be a separate component of server grouping 100. Within a microserver architecture, where individual BMCs connect to a CMC, network switch 112 may be hosted by the CMC, through which all the BMCs can communicate with each other.

In one example, a client system connecting to server grouping 100, such as client computer 170, may initially communicate with CMM 110 and request mapping table 116 from CMM 110. In the example, based on the information in mapping table 116, client computer 170 may establish a connection with a particular service processor, such as service processor 150, specify the target MTMS for a request for a particular functional domain to the service processor assigned to the particular functional domain in mapping table 116, and send the request with the target MTMS specified for a particular service processor to service processor 150. In one example, upon receiving client requests, each service processor, such as service processor 150, may check the target MTMS specified in the request to determine if the request is intended for the server on which the client request was received. If the client request is intended for a different target server, the primary service processor receiving the request may determine the IP address assigned to the MTMS in mapping table 116 and forward the request, using network switch 112 on CMM 110, to the target server. For example, if service processor 150 determines that service processor 140 is specified in mapping table 116 in association with the MTMS in a request from client computer 170, service processor 150 forwards the request to service processor 140. Service processor 140 receives the request, processes the request, and returns a response to service processor 150 to return to client computer 170.

In the example, in the event of a primary service processor failing, only the particular functional domain hosted on the failed primary service processor fails over to the backup service processor assigned to the same functional domain in mapping table 116, while the other functional domains continue to function. In the example, by implementing mapping table 116, multiple levels of redundancy are implemented, with a first level of redundancy implemented by distributing the functional domains independently across multiple primary service processors, rather than a single service processor, such that on failover only a single functional domain is required to failover and the remaining functional domains continue to function as normal on the other primary service processors, and a second level of redundancy implemented by assigning a separate backup service processor to each of the functional domains.

In one example, mapping controller 114 may communicate with each connected service processor within server grouping 100 to inform each connected service processor of its roles for the assigned functional domains in mapping table 116. In the example, using service location protocol (SLP), each service processor within server grouping 100 may broadcast its IP address, machine type model, serial number, and capabilities. Each service processor may detect the broadcast details from the other service processors and store the broadcast details on each service processor.

In addition, when CMM 110 identifies a loss of a service processor, mapping controller 114 refers to mapping table 116 to determine the failed functional domain assigned to the failed service processor as a primary service processor and identify the backup service processor for the failed functional domain. CMM 110 may notify the backup service processor for the failed functional domain to take over as the primary service processor for the failed functional domain, triggering failover. Only the particular functional domain hosted on the failed primary service processor fails momentarily until the identified backup service processor fails over and starts hosting the particular functional domain; all other functional domains are still functional during failover of the particular functional domain. Upon failover for a particular functional domain, mapping controller 114 may dynamically select a new backup service processor for the particular functional domain, to replace the backup service processor for the functional domain that has been reassigned as the primary service processor. In one example, mapping controller 114 may update mapping table 116 with the new backup service processor for a particular functional domain and CMM 110 may inform the new backup service processor about the backup role for the particular functional domain.

By distributing redundancy of service processor functionality on a functional domain level across multiple service processors, if a service processor fails, only the functional domain on the failing service processor is affected and the remaining functional domains may continue to operate without any failures. In addition, by distributing redundancy of service processor functionality of a functional domain level across multiple service processors, during failover, the delay is minimized to the failover time for the specific functional domain on the failing service processor to failover from the primary service processor to a backup service processor that is pre-assigned to the specific functional domain. By failing over only a single functional domain of service processor functionality, rather than all the service processor functionality, the delay caused by failover is minimized to only those connections that need to switch for the particular functional domain, in contrast to the larger delay that would be required to switch all the functional domains. By failing over to a pre-assigned backup service processor, there is no need for the service processors to vote for a backup service processor and no delay caused by such voting.

In one example, there are one or more reasons why a service processor may fail. In one example, a service processor may fail if a user physically pulls the blade server hosting the service processor out from the chassis. In particular, CMM 110 may identify a loss of a blade server based on setting of a physical presence detect mechanism. In response to CMM 110 detecting the physical presence detect mechanism change, CMM 110 accesses mapping table 116 to determine the functional domains assigned to the primary service processor, determine the backup service processor assigned to the failed functional domains, and inform the backup service processor to take the role of the primary. In another example, a service processor may fail if service processor firmware halts and the service processor cannot service client requests for a functional domain assigned to the service processor anymore. In particular, a periodic ping between the primary and backup service processor for a functional domain or between CMM 110 and the primary service processor may be used to identify an unresponsive service processor, based upon which the backup service processor can take on the role of primary.

In one example, pre-assigning functional domains to mapping table 116 requires dynamically selecting primary and backup service processor pairings for each functional domain by mapping controller 114 because server configurations differ between systems. Configurations may vary based upon the current processors and memory, number of logical partitions that are dedicated or shared, management by one or more HMCs, management by one or more CMMs, the presence of redundant service processors within the same server, and a configuration spanning across multiple chassis. In addition, once failover occurs, dynamically selecting the new backup service processor for a functional domain after failover, when the pre-assigned backup service processor has assumed the role of primary service processor, requires dynamic assignments by mapping controller 114 because transactions may be in progress over one or more functional domains, therefore if there is a failover for a particular functional domain, any connecting clients need to switch to the backup service processor for a particular functional domain on the failed service processor and any connecting clients need to be informed about the new backup service processor for the particular functional domain so that the connecting clients can switch to the backup service processor on a subsequent failover of the particular functional domain.

Figure 2:
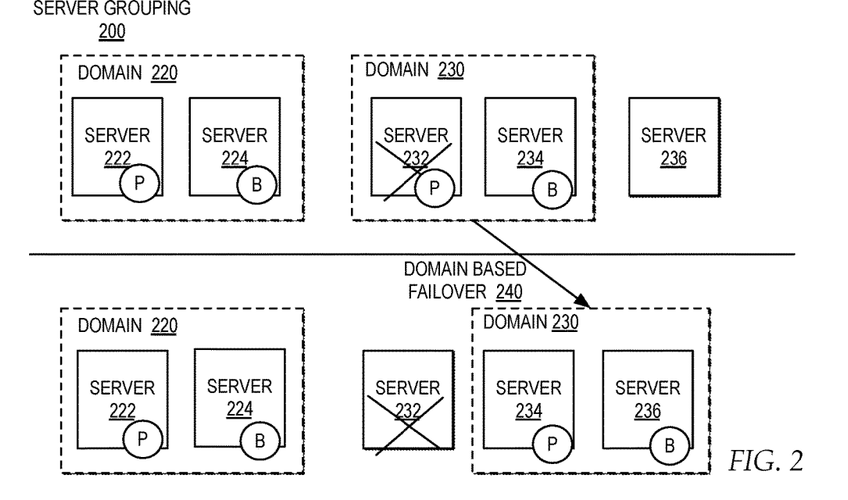
FIG. 2 is a block diagram illustrating one example of a failover, at a functional domain level, within a grouping of servers.

For example, FIG. 2 illustrates a block diagram of one example of a failover, at a functional domain level, within a grouping of servers. In one example, a server group 200 includes a server 222, a server 224, a server 232, a server 234, and a server 236. In one example, within server group 200, functional domains are mapped at a functional domain level to selections of service processors of servers. For example, a domain 220 is mapped to a primary service processor "P" of server 222 and a backup service processor "B" of server 224 and a domain 230 is mapped to a primary service processor "P" of server 232 and a backup service processor "B" of server 234.

In one example, server 232 fails, as indicated by the "X" over server 232. In response to the failure of server 232, only domain 230 needs to failover to a functional server because only domain 230, from among multiple functional domains, is mapped to primary service processor of server 232. During failover of domain 230, as illustrated at reference numeral 240, the mapping for domain 230 is dynamically updated with a service processor for server 234 transitioned from the backup service processor "B" to the primary service processor "P" for domain 230 and server 236 designated as the backup service processor "B" for domain 230. In the example, during failover, the mapping for domain 220 remains constant because the failure of server 232 does not impact the functionality of domain 220.

Returning to FIG. 1, in one example, mapping controller 114 may dynamically select the initial primary and backup service processor assignments by functional domain and may dynamically select the new backup service processor for a functional domain following failover by considering the affinity between functional domains at a service processor level or a chassis level. In one example, affinity may be defined in an affinity table 118. In one example, affinity within affinity table 118 may be defined for groups of two or more functional domains and the strength of affinity of the group defined on a scale of "1 to 5", with "1" being a lowest affinity and "5" being a highest affinity mandating that the functional domains be together always. In one example, an affinity strength of "3" may mean that there is a preference for the functional domains to be together, but it is not required.

Affinity strength may be specified at one or more levels including, but not limited to, a service processor level strength and a chassis level strength. For example, a service processor level strength may indicate whether groups of functional domains have to reside on a same service processor. For example, a chassis level strength may indicate whether groups of functional domains may reside on different service processors, but within the same chassis. In one example, the affinity between functional domains may be defined statically and independent of the type of configuration of the underlying system of server grouping 100.

In addition, in one example, mapping controller 114 may dynamically select the initial primary and backup service processor assignments by functional domain and may dynamically select the new backup service processor for a functional domain following failover by considering additional criteria. In one example, a criteria may specify that access to HMC 160 is considered critical if the server has several logical partitions or virtual machines. In another example, a criteria may specify that access to CMM is considered critical if the server is a blade in a chassis. In another example, a criteria may specify that text consoles or virtual serial terminal connections are always attached to service processors hosting either CMM or MC access functional domains. In another example, a criteria may specify that in a SMP configuration operating across multiple chassis, the primary and backup SPs for each functional domain are placed on different chassis.

In addition, in one example, CMM 110 may provides an interface controller 119 for supporting an interface through which to easily inform clients of which server's service processor is acting as primary for each functional domain. In one example, users may go to interface controller 119 of CMM 110 to request identifying a primary service processor for a specific functional domain. In one example, interface controller 119 may support an interface that visually indicates which server's service processor has currently assumed the role of primary for each separate functional domain. For example, interface controller 119 may respond to the user request to identify a primary service processor for a specific functional domain by CMM 110 sending a command to the particular service processor assigned to the user specified functional domain to trigger an LED for the particular service processor to blink at a particular frequency. In another example, interface 119 may output a graphical visual representation for display in a user interface, where the graphical visual representation illustrates a chassis of server group 100, with each of the blades, and graphically distinguishes, by highlighting, the specific blade server hosting the primary service processor for the user specified functional domain.

Figure 3:
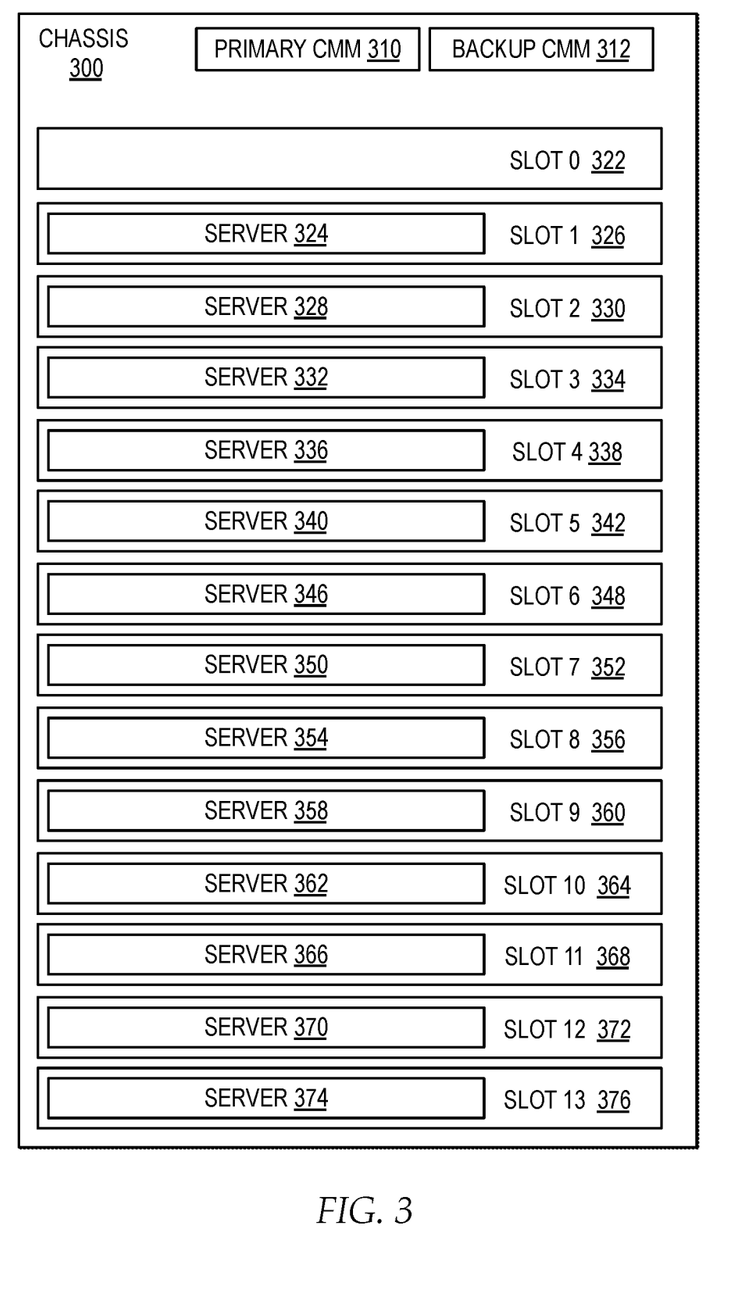
FIG. 3 is a block diagram illustrating one example of a chassis including multiple slots for blade servers for a grouping of servers.

FIG. 3 illustrates a block diagram of one example of a chassis including multiple slots for blade servers for a grouping of servers.

In one example, a chassis 300 may represent a hardware chassis with multiple slots for connectively and physically integrating blade servers into a server grouping within chassis 300 or across multiple chassis. In one example, chassis 300 may include one or more management components for managing the grouping of servers within chassis or across multiple chassis. For example, chassis 300 may implement a primary CMM 310 and a backup CMM 312, where backup CMM 312 is available to manage chassis 300 if primary CMM 310 fails or workload may be balanced between primary CMM 310 and backup CMM 312.

In one example, chassis 300 includes fourteen slots illustrated by slot 0 322, slot 1 326, slot 2 330, slot 3 334, slot 4 338, slot 5 342, slot 6 348, slot 7 352, slot 8 356, slot 9 360, slot 10 364, slot 11 368, slot 12 372, and slot 13 376. In additional or alternate examples, chassis 300 may include additional or alternate numbers of slots.

In one example, one or more of the slots within chassis 300 may be configured for one or more servers to be inserted into and installed in the slots. Each of the slots may be configured so that the servers inserted into the slots may be removable and interchangeable, such that if a server inserted in a slot fails, the server can be easily removed and a replacement server inserted into and installed in the slot. In one example, the servers installed within the slots of chassis 300 may include one or more types of servers including, but not limited to, blade servers and microservers.

In one example, a server 324 is inserted into slot 1 326, a server 328 is inserted into slot 2 330, a server 332 is inserted into slot 3 334, a server 336 is inserted into slot 4 338, a server 340 is inserted into slot 5 342, a server 346 is inserted into slot 6 348, a server 350 is inserted into slot 7 352, a server 354 is inserted into slot 8 356, a server 358 is inserted into slot 9 360, a server 362 is inserted into slot 10 364, a server 366 is inserted into slot 11 368, a server 370 is inserted into slot 12 372, and a server 374 is inserted into slot 13 376. In additional or alternate examples, a single slot may be configured for multiple servers. In one example, one or more slots may be open without impacting the performance of the grouping of servers. For example, slot 0 322 is illustrated as open, without a server inserted into the slot.

In one example, the one or more servers inserted into the slots of chassis 300 may be managed in a single grouping of servers on chassis 300 or multiple groupings of servers. In additional or alternate examples, multiple chassis may be communicatively connected to facilitate a grouping of servers across multiple chassis.

Figure 4:
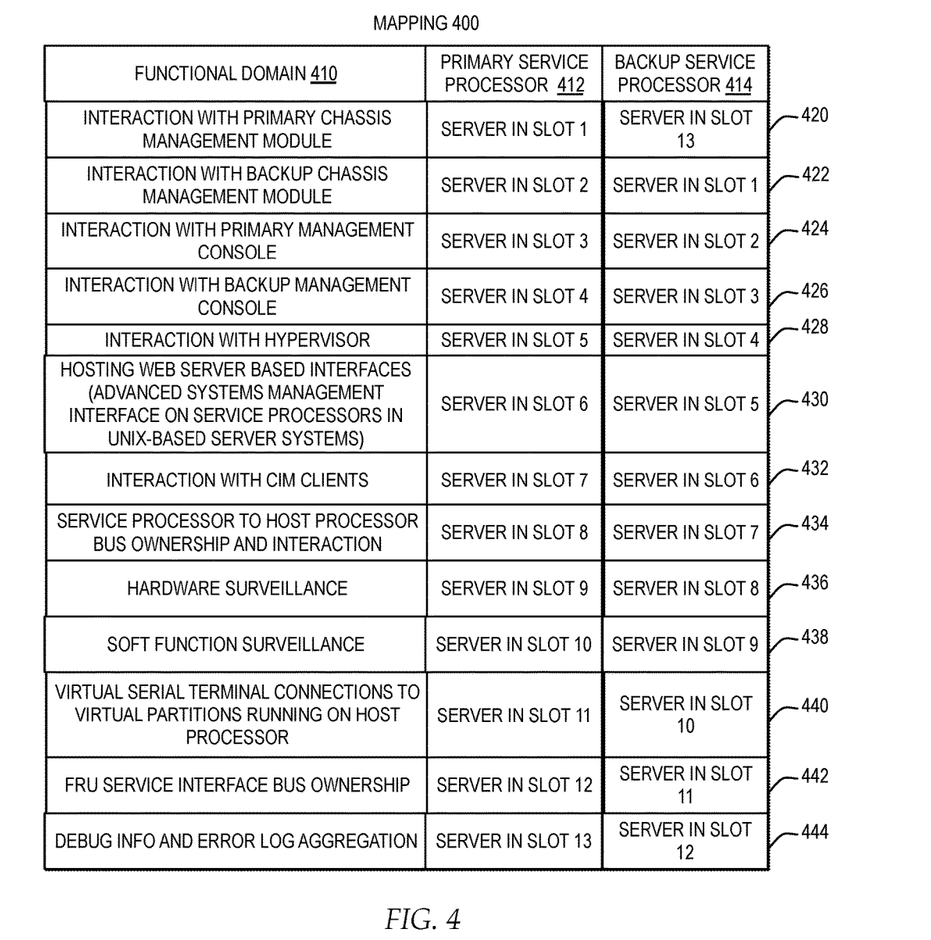
FIG. 4 is a table of one example of a mapping, by functional domain, of a primary service processor assignment and a backup service processor assignment within a grouping of servers.

FIG. 4 illustrates a table of one example of a mapping, by functional domain, of a primary service processor assignment and a backup service processor assignment within a grouping of servers.

In one example, a mapping 400 specifies a mapping of each functional domain to a primary service processor and a backup service processor within a grouping of servers. In one example, mapping 400 is represented by a table with a first column specifying a particular functional domain 410, a second column specifying a primary service processor 412, and a third column specifying a backup server processor 414. In additional or alternate embodiments, mapping 400 may include additional or alternate elements.

In the example, a mapping controller dynamically specifies mapping 400 for the functional domains implemented within a grouping of servers illustrated in chassis 300 of FIG. 3, where slot 0 322 and slot 12 372 are not currently included in mapping 400. In one example, if one or more servers is inserted into slot 0 322, a mapping controller may dynamically adjust mapping 400 to include the servers inserted into the slots. In addition, in one example, if one or more servers in one of the slots fails or is removed from a slot, a mapping controller may dynamically adjust mapping 400 to replace the failed or removed server with an active server.

In the example illustrated in FIG. 4, mapping 400 includes a first entry 420 with a functional domain specified to "interaction with primary chassis management module (CMM)", a primary service processor specified to "server in slot 1" and a secondary service processor specified to "server in slot 13". Mapping 400 includes a second entry 422 with a functional domain specified to "interaction with backup chassis management module (CMM)", a primary service processor specified to "server in slot 2" and a secondary service processor specified to "server in slot 1". In one example, a CMM may provide a web-based user interface that may be used to manage and configure one or more chassis through a web browser. In one example, a CMM web interface may communicate with a management program to execute chassis management tasks including, but not limited to: access and configure I/O modules; initialize storage nodes; change the startup sequence in a compute note; configure security settings; control the chassis, compute nodes and other components; define login identifiers and passwords; discover other chassis on a network and enable access; monitor the status of compute nodes and other components; and use a remote console for compute nodes.

In one example, mapping 400 includes a third entry 424 with a functional domain specified to "interaction with primary management console", a primary service processor specified to "server in slot 3" and a secondary service processor specified to "server in slot 2". Mapping 400 includes a fourth entry 426 with a functional domain specified to "interaction with backup management console", a primary service processor specified to "server in slot 4" and a secondary service processor specified to "server in slot 3". In one example, a management console may represent a system management component designed to manage one or more systems containing blade servers, which require a compatible blade enclosure. In one example, a management console may monitor multiple fully loaded chassis with no additional cabling via a single web interface. In one example, a management console interface may integrate with administrative modules in each blade or server node. In one example, a management console may backup and replicate settings on a chassis and save profiles of individual blade servers. In one example, a management console may capture a chassis inventory across all the connected chassis.

Mapping 400 includes a fifth entry 428 with a functional domain specified to "interaction with hypervisor", a primary service processor specified to "server in slot 5" and a secondary service processor specified to "server in slot 4". Mapping 400 includes a sixth entry 430 with a functional domain specified to "hosting web server based interfaces (advanced systems management interface (ASMI) on service processors in unix-based server systems")", a primary service processor specified to "server in slot 6" and a secondary service processor specified to "server in slot 5". In one example, an ASMI is a graphical interface that is part of the service processor firmware. The ASMI may manage and communicate with the service processor. The ASMI may be required to set up the service processor and to perform service tasks, such as reading service processor error logs, reading vital product data, and controlling the system power. In one example, the ASMI may be accessed via the HMC.

Mapping 400 includes a seventh entry 432 with a functional domain specified to "interaction with common information model (CIM) clients", a primary service processor specified to "server in slot 7" and a secondary service processor specified to "server in slot 6". In one example, CIM is an open standard that defines how managed elements in an IT environment are represented in an extensible, object-oriented data model that contains different information bout different parts of an enterprise. In one example, CIM may enable presentation of a consistent view of logical and physical objects in a management environment.

Mapping 400 includes an eighth entry 434 with a functional domain specified to "service processor to host processor bus ownership and interaction", a primary service processor specified to "server in slot 8" and a secondary service processor specified to "server in slot 7". In one example, bus ownership may be set to a type of shared or dedicated. The service processor may host bus ownership changes of type and between partitions and manage bus ownership change errors.

Mapping 400 includes a ninth entry 436 with a functional domain specified to "hardware surveillance", a primary service processor specified to "server in slot 9" and a secondary service processor specified to "server in slot 8".

Mapping 400 includes a tenth entry 438 with a functional domain specified to "soft function surveillance", a primary service processor specified to "server in slot 10" and a secondary service processor specified to "server in slot 9". In one example, firmware may detect correctable errors within processors and log the errors. The firmware may detect when the number of processor errors reaches a threshold and return an error report for the hardware when polled. Hardware surveillance functions of an operating system may regularly poll the firmware for hardware errors. If the hardware surveillance functions receive an error report from firmware for a processor, the operating system logs the error report and may attempt to stop using and deallocate the processor.

Mapping 400 includes an eleventh entry 440 with a functional domain specified to "virtual serial terminal connections to virtual partitions running on host processor", a primary service processor specified to "server in slot 11" and a secondary service processor specified to "server in slot 10". Mapping 400 includes a twelfth entry 442 with a functional domain specified to "FRU service interface bus ownership", a primary service processor specified to "server in slot 12" and a secondary service processor specified to "server in slot 11". Mapping 400 includes a thirteenth entry 444 with a functional domain specified to "debug info and error log aggregation", a primary service processor specified to "server in slot 13" and a secondary service processor specified to "server in slot 12".

In the example, as illustrated, a service processor of a server may be designated as a primary service processor for one or more functional domains and as a backup service processor for one or more functional domains. In addition, as illustrated in the example, for each functional domain, the primary service processor and backup service processor may be specified from servers in adjacent slots or in non-adjacent slots within chassis 300.

Figure 5:
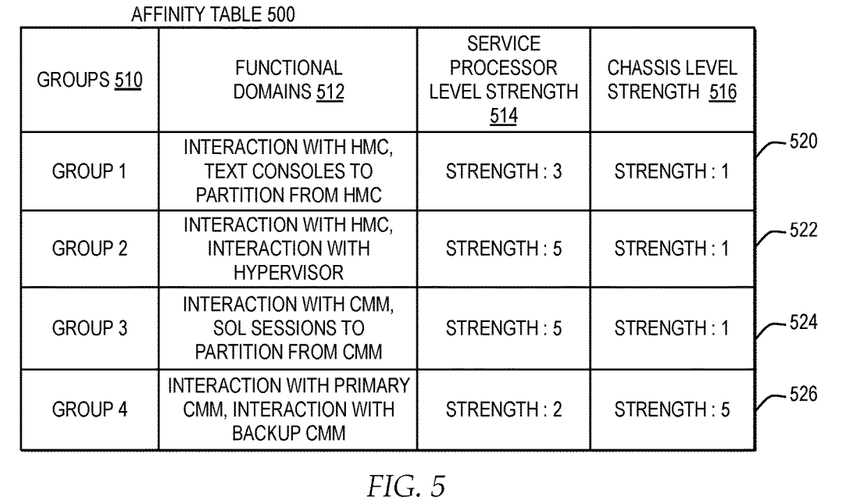
FIG. 5 is a table of one example of an affinity assignment of a service processor level strength and chassis level strength by functional domains specified in groups.

FIG. 5 illustrates a table of one example of an affinity assignment of a service processor level strength and chassis level strength by functional domains specified in groups.

In one example, an affinity table 500 specifies a strength of a service processor and chassis level to groupings of functional domains. In one example, affinity table 500 is represented by a table within a first column specifying a group identifier 510, a second column specifying a domains 512, a third column specifying a service processor level strength 514, and a fourth column specifying a chassis level strength 516. In additional or alternate embodiments, affinity table 500 may include additional or alternate elements.

In the example, a first entry 520 includes a group identifier "group 1", with functional domains including "interaction with HMC, text consoles to partition from HMC", with a service processor level strength of "3" and a chassis level strength of "1". A second entry 522 includes a group identifier of "group 2", with functional domains including "interaction with HMC, interaction with hypervisor", with a service processor level strength of "5" and a chassis level strength of "1". A third entry 524 includes a group identifier of "group 3", with functional domains including "interaction with CMM, SOL sessions to partition from CMM", with a service processor level strength of "5" and a chassis level strength of "1". A fourth entry 526 includes a group identifier of "group 4", with functional domains including "interaction with primary CMM, interaction with backup CMM", with a service processor level strength of "2" and a chassis level strength of "5".

Figure 6:
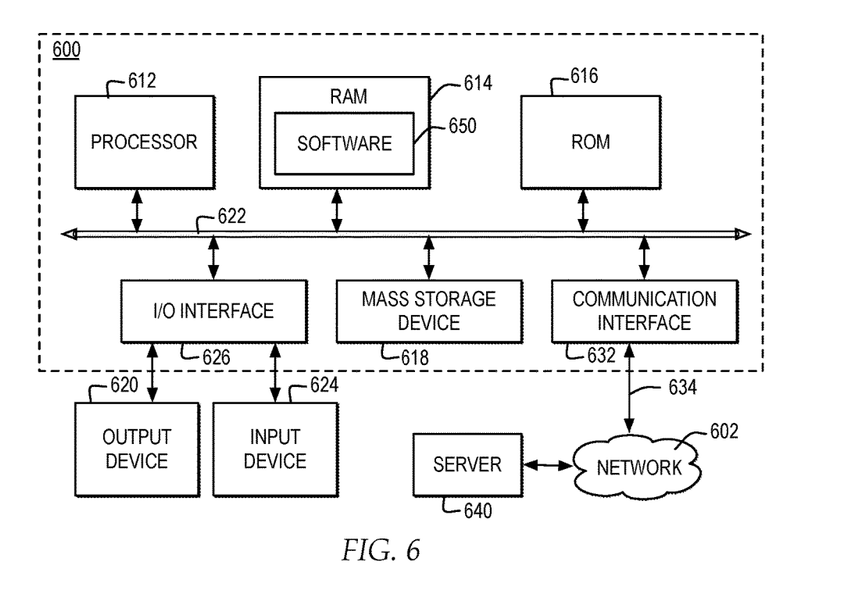
FIG. 6 is a block diagram of one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional domain components, such as the functional domain components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

Figure 7:
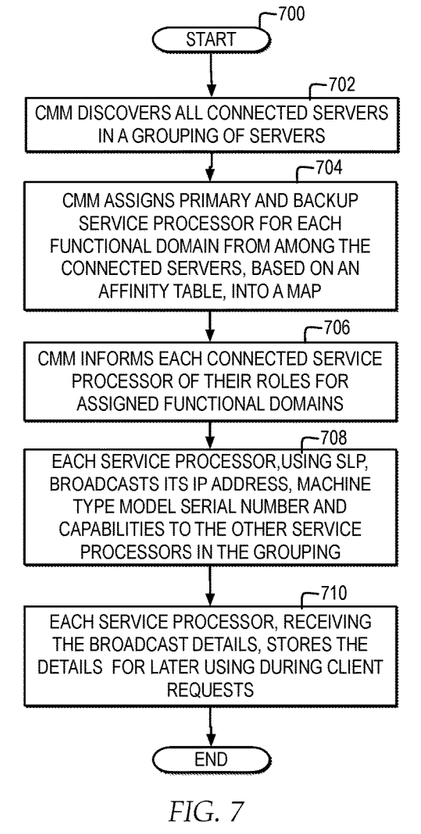
FIG. 7 is a high level logic flowchart of a process and computer program for dynamically generating a mapping, by functional domain, of a primary service processor and a backup service processor, within a grouping of servers.
Figure 8:
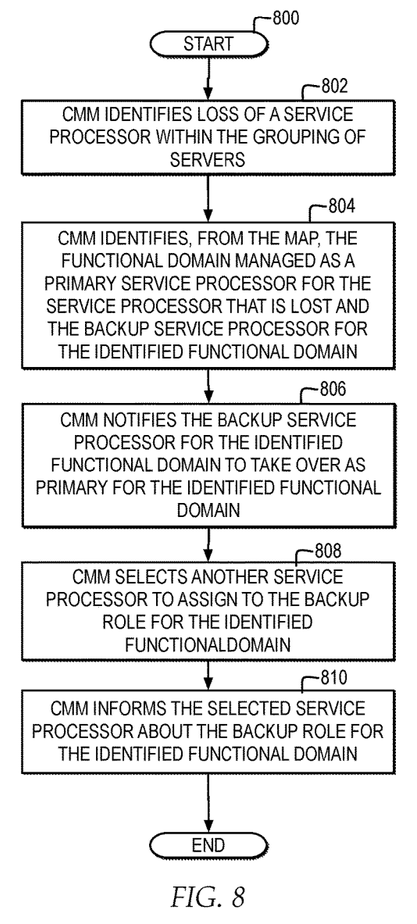
FIG. 8 is a high level logic flowchart of a process and computer program for managing failover, by functional domain, within a grouping of servers.
Figure 9:
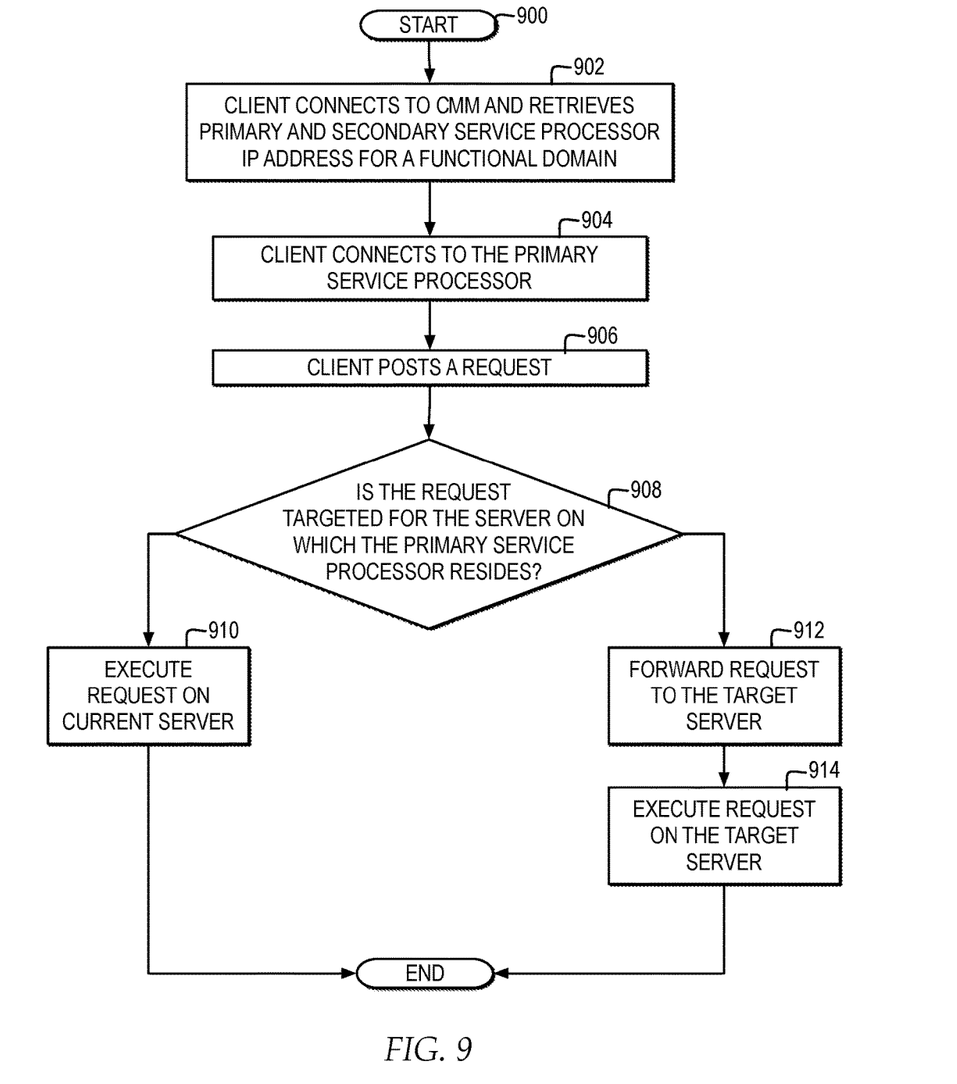
FIG. 9 is a high level logic flowchart of a process and computer program for managing client requests to a grouping of servers by functional domain.

In one embodiment, the operations performed by processor 612 may control the operations of flowchart of FIGS. 7-9 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts in FIGS. 7-9.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being ansitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing, devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 7 illustrates a high level logic flowchart of a process and computer program for dynamically generating a mapping, by functional domain, of a primary service processor and a backup service processor, within a grouping of servers.

As illustrated, in one example, a process and computer program begin at block 700 and thereafter proceed to block 702. Block 702 illustrates the CMM discovering all connected servers by communicating with the service processors of the connected servers in a grouping of servers. Next, block 704 illustrates the CMM assigning primary and backup service processors for each functional domain from among the connected servers, based on an affinity table, into a map. Thereafter, block 706 illustrates the CMM informing each connected service processor of their roles for the assigned functional domains. Next, block 708 illustrates each service processor using SLP to broadcast its IP address, machine type model serial number, and capabilities to the other servers in the grouping. Block 710 illustrates each service processor in the grouping, receiving the broadcast details from other service processors, storing the details for later use during client requests, and the process ends.

FIG. 8 illustrates a high level logic flowchart of a process and computer program for managing failover, by functional domain, within a grouping of servers.

As illustrated, in one example, a process and computer program begin at block 800 and thereafter proceed to block 802. Block 802 illustrates a CMM identifying a loss of a service processor within the grouping of servers. Next, block 804 illustrates the CMM identifying, from the map, the functional domain managed as a primary service processor for the service processor that is lost and the backup service processor for the identified functional domain. Thereafter, block 806 illustrates notifying the backup service processor the identified functional domain to take over as primary for the identified functional domain. Next, block 808 illustrates selecting another active service processor in the grouping of servers to assign to the backup role for the identified functional domain. Thereafter, block 810 illustrates informing the selected service processor about the backup role for the identified functional domain, and the process ends.

FIG. 9 illustrates a high level logic flowchart of a process and computer program for managing client requests to a grouping of servers by functional domain.

As illustrated, in one example, a process and computer program begin at block 900 and thereafter proceed to block 902. Block 902 illustrates a client connecting to a CMM and retrieving a primary and secondary service processor IP address for a particular functional domain. Next, block 904 illustrates the client connecting to the primary service processor via the retrieved IP address. Thereafter, block 906 illustrates the client posting a request to the primary service processor. Next, block 908 illustrates a determination whether the request is targeted for the server on which the primary service processor resides.

At block 908, if the request is targeted for the server on which the primary service processor resides, then the process passes to block 910. Block 910 illustrates executing the request on the current server, and the process ends.

At block 908, if the request is not targeted for the server on which the primary service processor resides, then the process passes to block 912. Block 912 illustrates forwarding the request to the target server. Next, block 914 illustrates executing the request on the target server, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
identifying a plurality of functional domains for controlling a grouping of a plurality of servers;
determining a separate affinity selection for each of a plurality of separate groupings each of two or more of the plurality of functional domains indicating a strength of an affinity that each of the two or more of the plurality of functional domains need to reside on one or more of a same service processor and a same chassis within the plurality of servers;
assigning, to each functional domain of the plurality of functional domains, a separate primary server from among the plurality of servers and a separate backup server from among the plurality of servers, wherein for each functional domain the separate primary server is different from the separate backup server and positioned on the plurality of servers based on the separate affinity selection for each of the plurality of separate groupings; and
responsive to detecting a failure in a particular primary server of the plurality of servers, automatically switching control of a particular functional domain assigned to the particular primary server from the particular primary server to a particular backup server assigned to the particular functional domain, such that only the particular functional domain from among the plurality of functional domains is down during the failure and switching control.

2. The method according to claim 1, wherein assigning, to each functional domain of the plurality of functional domains, a separate primary server from among the plurality of servers and a separate backup server from among the plurality of servers, wherein for each functional domain the separate primary server is different from the separate backup server and positioned on the plurality of servers based on the separate affinity selection for each of the plurality of separate groupings, further comprises:

forming a pre-configured mapping with an entry for each functional domain specifying a separate pair of servers from among the plurality of servers by assigning, to each functional domain, the separate primary server from among the plurality of servers and the separate backup server from among the plurality of servers.

3. The method according to claim 1, wherein assigning, to each functional domain of the plurality of functional domains, a separate primary server from among the plurality of servers and a separate backup server from among the plurality of servers, wherein for each functional domain the separate primary server is different from the separate backup server and positioned on the plurality of servers based on the separate affinity selection for each of the plurality of separate groupings, further comprises:
  determining the separate affinity selection for each of the plurality of separate groupings of each of two or more of the plurality of functional domains indicating a strength of the affinity that each of the two or more of the plurality of functional domains need to reside on one or more of the same service processor, the same chassis, a same chassis management module, and a same switch.

4. The method according to claim 1, further comprising:
  identifying each functional domain of the plurality of functional domains using a service location protocol.

5. The method according to claim 1, wherein identifying a plurality of functional domains for controlling a grouping of a plurality of servers further comprises:
  identifying the grouping of the plurality of servers, each of the plurality of servers comprising one or more of a blade and a rack, each of the plurality of servers installed within one or more chassis, each of the one or more chassis operating in a non-uniform memory access mode with a single instance of a hypervisor virtualizing resources across the plurality of servers and controlled by a management console.

6. The method according to claim 1, wherein identifying a plurality of functional domains for controlling a grouping of a plurality of servers further comprises:
  identifying the grouping of the plurality of servers wherein each server of the plurality of servers comprises a service processor for managing one or more of the plurality of functional domains assigned to the server housing the service processor.

7. The method according to claim 1, wherein identifying a plurality of functional domains for controlling a grouping of a plurality of servers further comprises:
  selecting each functional domain from among the plurality of functional domains from one or more of interaction with a primary chassis management module, interaction with a backup chassis management module, interaction with a primary management console, interaction with a backup management console, interaction with a hypervisor, hosting web server based interfaces, interaction with one or more common information model clients, a service processor to host a processor bus ownership, hardware surveillance, soft function surveillance, virtual serial terminal connections to virtual partitions running on a host processor, support interface bus ownership, and debug info and error log aggregation.

8. The method of claim 1, wherein responsive to detecting a failure in a particular primary server of the plurality of servers, automatically switching control of a particular functional domain assigned to the particular primary server from the particular primary server to a particular backup server assigned to the particular functional domain further comprises:
  identifying the particular functional domain assigned to the particular primary server;
  identifying the particular backup server assigned to the particular functional domain;
  notifying the particular backup server to take over a primary role for the particular functional domain;
  assigning a second server from among the plurality of servers to a backup role for the particular functional domain; and
  notifying the second server that the second server is assigned to the backup role for the particular functional domain.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
  program instructions to identify a plurality of functional domains for controlling a grouping of a plurality of servers;
  program instructions to determine a separate affinity selection for each of a plurality of separate groupings each of two or more of the plurality of functional domains indicating a strength of an affinity that each of the two or more of the plurality of functional domains need to reside on one or more of a same service processor and a same chassis within the plurality of servers;
  program instructions to assign, to each functional domain of the plurality of functional domains, a separate primary server from among the plurality of servers and a separate backup server from among the plurality of servers, wherein for each functional domain the separate primary server is different from the separate backup server and positioned on the plurality of servers based on the separate affinity selection for each of the plurality of separate groupings; and
  program instructions, responsive to detecting a failure in a particular primary server of the plurality of servers, to automatically switch control of a particular functional domain assigned to the particular primary server from the particular primary server to a particular backup server assigned to the particular functional domain.

10. The computer system according to claim 9, the stored program instructions further comprising:
  program instructions to form a pre-configured mapping with an entry for each functional domain specifying a separate pair of servers from among the plurality of servers by assigning, to each functional domain, the separate primary server from among the plurality of servers and the separate backup server from among the plurality of servers.

11. The computer system according to claim 9, the stored program instructions further comprising:
  program instructions to determine the separate affinity selection for each of the plurality of separate groupings of each of two or more of the plurality of functional domains indicating a strength of the affinity that each of the two or more of the plurality of functional domains need to reside on one or more of the same service processor, the same chassis, a same chassis management module, and a same switch.

12. The computer system according to claim 9, the stored program instructions further comprising:

program instructions to identify each functional domain of the plurality of functional domains using a service location protocol.

13. The computer system according to claim 9, the stored program instructions further comprising:

program instructions to identify the grouping of the plurality of servers, each of the plurality of servers comprising one or more of a blade and a rack, each of the plurality of servers installed within one or more chassis, each of the one or more chassis operating in a non-uniform memory access mode with a single instance of a hypervisor virtualizing resources across the plurality of servers and controlled by a management console.

14. The computer system according to claim 9, the stored program instructions further comprising:

program instructions to identify the grouping of the plurality of servers wherein each server of the plurality of servers comprises a service processor for managing one or more of the plurality of functional domains assigned to the server housing the service processor.

15. The computer system according to claim 9, the stored program instructions further comprising:

program instructions to select each functional domain from among the plurality of functional domains from one or more of interaction with a primary chassis management module, interaction with a backup chassis management module, interaction with a primary management console, interaction with a backup management console, interaction with a hypervisor, hosting web server based interfaces, interaction with one or more common information model clients, a service processor to host a processor bus ownership, hardware surveillance, soft function surveillance, virtual serial terminal connections to virtual partitions running on a host processor, support interface bus ownership, and debug info and error log aggregation.

16. A computer program product comprising one or more computer-readable storage devices and program instructions, stored on at least one of the one or more storage devices, the stored program instructions comprising:

program instructions to identify a plurality of functional domains for controlling a grouping of a plurality of servers;

program instructions to determine a separate affinity selection for each of a plurality of separate groupings each of two or more of the plurality of functional domains indicating a strength of an affinity that each of the two or more of the plurality of functional domains need to reside on one or more of a same service processor and a same chassis within the plurality of servers;

program instructions to assign, to each functional domain of the plurality of functional domains, a separate primary server from among the plurality of servers and a separate backup server from among the plurality of servers, wherein for each functional domain the separate primary server is different from the separate backup server and positioned on the plurality of servers based on the separate affinity selection for each of the plurality of separate groupings; and program instructions, responsive to detecting a failure in a particular primary server of the plurality of servers, to automatically switch control of a particular functional domain assigned to the particular primary server from the particular primary server to a particular backup server assigned to the particular functional domain.

17. The computer program product according to claim 16, the stored program instructions further comprising:

program instructions to form a pre-configured mapping with an entry for each functional domain specifying a separate pair of servers from among the plurality of servers by assigning, to each functional domain, the separate primary server from among the plurality of servers and the separate backup server from among the plurality of servers.

18. The computer program product according to claim 16, the stored program instructions further comprising:

program instructions to determine the separate affinity selection for each of the plurality of separate groupings of each of two or more of the plurality of functional domains indicating a strength of the affinity that each of the two or more of the plurality of functional domains need to reside on one or more of the same service processor, the same chassis, a same chassis management module, and a same switch.

19. The computer program product according to claim 16, the stored program instructions further comprising:

program instructions to identify each functional domain of the plurality of functional domains using a service location protocol.

20. The computer program product according to claim 16, the stored program instructions further comprising:

program instructions to identify the grouping of the plurality of servers, each of the plurality of servers comprising one or more of a blade and a rack, each of the plurality of servers installed within one or more chassis, each of the one or more chassis operating in a non-uniform memory access mode with a single instance of a hypervisor virtualizing resources across the plurality of servers and controlled by a management console.

\* \* \* \* \*